(12) United States Patent
Nitzschner et al.

(10) Patent No.: US 12,040,645 B2
(45) Date of Patent: Jul. 16, 2024

(54) ADAPTER

(71) Applicant: Hilti Aktiengesellschaft, Schaan (LI)

(72) Inventors: Michael Nitzschner, Augsburg (DE);
Muralidhar Venkatraman, Kaufering (DE); Leonard Janczyk, Landsberg am Lech (DE)

(73) Assignee: Hilti Aktiengesellschaft, Schaan (LI)

( * ) Notice: Subject to any disclaimer, the term of this patent is extended or adjusted under 35 U.S.C. 154(b) by 198 days.

(21) Appl. No.: 17/762,828

(22) PCT Filed: Oct. 6, 2020

(86) PCT No.: PCT/EP2020/077939
§ 371 (c)(1),
(2) Date: Mar. 23, 2022

(87) PCT Pub. No.: WO2021/073939
PCT Pub. Date: Apr. 22, 2021

(65) Prior Publication Data
US 2022/0352735 A1    Nov. 3, 2022

(30) Foreign Application Priority Data

Oct. 16, 2019   (EP) .................................. 19203585

(51) Int. Cl.
*B25F 5/00*      (2006.01)
*H02J 7/00*      (2006.01)

(52) U.S. Cl.
CPC ............. *H02J 7/0045* (2013.01); *B25F 5/00* (2013.01); *H02J 7/0029* (2013.01); *H02J 7/0047* (2013.01)

(58) Field of Classification Search
CPC .................................. B25F 3/00; H01M 50/24
See application file for complete search history.

(56) References Cited

U.S. PATENT DOCUMENTS

| 2011/0197389 | A1* | 8/2011 | Ota ..................... H01M 10/488 429/121 |
| 2016/0020443 | A1* | 1/2016 | White ................ H01M 50/213 318/245 |
| 2018/0054032 | A1 | 2/2018 | Peloquin et al. |
| 2019/0259985 | A1* | 8/2019 | Hanawa ............... H02J 7/0024 |

FOREIGN PATENT DOCUMENTS

| WO | WO-2013014914 A2 * | 1/2013 | ............... B25F 3/00 |
| WO | WO-2014006906 A2 * | 1/2014 | ............... A45F 3/14 |
| WO | WO 2014014128 A1 | 1/2014 | |

OTHER PUBLICATIONS

International Search Report of PCT/EP2020/077953, dated Mar. 10, 2021.

* cited by examiner

*Primary Examiner* — Eyamindae C Jallow
(74) *Attorney, Agent, or Firm* — Davidson Kappel LLC

(57) ABSTRACT

An adapter for releasably connecting a power tool to a rechargeable battery, and a first and a second interface, a first set of control electronics and a second set of control electronics and a switching element for reversibly setting the second control electronics to an activation mode or deactivation mode, wherein in the activation mode at least a first transistor can be driven such that electrical energy can pass from the rechargeable battery to the power tool. A system with the power tool and adapter and a method for open-loop and closed-loop control of an adapter are also provided.

14 Claims, 3 Drawing Sheets

ADAPTER

The present invention relates to an adapter for releasably connecting a power tool to at least one rechargeable battery.

In addition, the present invention relates to a system comprising a power tool with at least one rechargeable battery for supplying the power tool with electrical energy and an adapter, the adapter being used for releasably connecting the power tool to the at least one rechargeable battery.

The present invention also relates to a method for open-loop and closed-loop control of an adapter for connecting a power tool to at least one rechargeable battery.

BACKGROUND

Modern power tools, such as hammer drills, saws, grinders or the like, can be supplied with electrical energy by an exchangeable rechargeable battery. Both the power tools and the rechargeable batteries usually also have communication interfaces, by means of which numerous items of information and data can be exchanged between the power tool and the rechargeable battery. The interfaces of the power tool and the rechargeable battery must match or be coordinated with one another so that a desired bilateral communication can take place between the power tool and the rechargeable battery. The compatibility of the two interfaces with one another is usually unproblematic if both the power tool and the rechargeable battery come from a corresponding or common generation. Such power tools and rechargeable batteries belonging to the power tools then generally have interfaces that match or are coordinated with one another.

SUMMARY OF THE INVENTION

Problems arise however when the interfaces of the power tools and the rechargeable batteries are technically so different that there is insufficient compatibility for a desired communication (i.e. data exchange) between the power tool and the rechargeable battery and/or for a sufficient supply of electrical energy.

It is an object of the present invention to provide an adapter for releasably connecting a power tool to at least one rechargeable battery with which the aforementioned problem can be solved and sufficient compatibility between a power tool and at least one rechargeable battery can be achieved.

Another object is to provide a system which comprises a power tool with at least one rechargeable battery for supplying the power tool with electrical energy and an adapter, so that the aforementioned problem can be solved and sufficient compatibility between a power tool and at least one rechargeable battery can be achieved.

The present invention provides an adapter for releasably connecting a power tool to at least one rechargeable battery.

According to the invention, the adapter comprises a first interface for releasably connecting the power tool to the adapter and a second interface for releasably connecting the at least one rechargeable battery to the adapter, a first set of control electronics for open-loop and closed-loop control of the functionality of the power tool and a second set of control electronics for open-loop and closed-loop control of the functionality of the rechargeable battery and a switching element for reversibly setting the second control electronics to an activation mode or deactivation mode, wherein in the activation mode at least a first transistor can be driven such that electrical energy can pass from the at least one rechargeable battery to the power tool.

According to an advantageous embodiment of the present invention, it may be possible that at least one sensor for detecting at least one parameter of the power tool and a second transistor are included, the second transistor being designed to interrupt at least temporarily the supply of the electrical energy from the rechargeable battery to the power tool when a parameter detected by the sensor reaches a predetermined threshold value. The parameter may be values of the electrical voltage, the value of the electrical current intensity, temperature values, the state of charge of the rechargeable battery or the like. By means of the second transistor, which substantially serves as a switching element for the optional interruption of a current or voltage supply, the current or voltage supply can be interrupted as a precaution when a threshold value is reached.

According to a further advantageous exemplary embodiment of the present invention, it may be possible that, instead of a first and second transistor, only a single transistor is contained in the adapter. The single transistor may in this case be contained in the second control electronics.

Furthermore, according to a further advantageous exemplary embodiment of the present invention, it is also possible that a first, second and third transistor are contained in the adapter. A first transistor may in this case be positioned in a positive path (positive line) of a power supply line. A second transistor may in this case be positioned in a negative path (i.e. negative line) of a power supply line. For safety reasons, a third transistor may be in a higher-level main current path (i.e. main current line).

The first and/or second transistor may be a metal-oxide-semiconductor field-effect transistor (MOSFET) or some other suitable field-effect transistor (FET). According to a further embodiment of the present invention, instead of the first and/or second transistor, a first and/or second switching element may also be correspondingly provided.

According to an advantageous embodiment of the present invention, it may be possible that at least one display device for displaying at least one state of the adapter is included.

According to an advantageous embodiment of the present invention, it may be possible that at least one voltage divider for supplying at least the first or second control electronics with electrical energy is included. This ensures that the first or second control electronics are supplied with electrical energy.

Furthermore, the object is achieved in particular by a system comprising a power tool with at least one rechargeable battery for supplying the power tool with electrical energy and an adapter, the adapter serving for releasably connecting the power tool to the at least one rechargeable battery.

According to the invention, the adapter in this case comprises a first interface for releasably connecting the power tool to the adapter and a second interface for releasably connecting the at least one rechargeable battery to the adapter, a first set of control electronics for open-loop and closed-loop control of the functionality of the power tool and a second set of control electronics for open-loop and closed-loop control of the functionality of the rechargeable battery and a switching element for reversibly setting the second control electronics to an activation mode or deactivation mode, wherein in the activation mode at least a first transistor can be driven such that electrical energy can pass from the at least one rechargeable battery to the power tool.

According to an advantageous embodiment of the present invention, it may be possible that at least one sensor for detecting at least one parameter of the power tool and a second transistor are included, the second transistor being designed to interrupt at least temporarily the supply of the electrical energy from the rechargeable battery to the power tool when a parameter detected by the sensor reaches a predetermined threshold value.

The first and/or second transistor may be a metal-oxide-semiconductor field-effect transistor (also called a MOSFET) or some other suitable field-effect transistor (also called a FET).

According to an advantageous embodiment of the present invention, it may be possible that at least one display device for displaying at least one state of the adapter is included.

According to an advantageous embodiment of the present invention, it may be possible that at least one voltage divider for supplying at least the first or second control electronics with electrical energy is included.

In addition, the present invention provides a method for open-loop and closed-loop control of an adapter for connecting a power tool to at least one rechargeable battery.

According to the invention, the method in this case comprises the method steps of:
connecting the adapter to the power tool and the at least one rechargeable battery;
setting the adapter from a deactivation mode to an activation mode; and
driving a first transistor, so that electrical energy can pass from the at least one rechargeable battery to the power tool.

According to an advantageous embodiment of the present invention, it may be possible that the method step of displaying at least one state of the adapter by means of at least one display device is included.

The releasable connection of the power tool to the at least one rechargeable battery means in this case a mechanical, electrical and/or electronic connection. The connection may also be referred to as a coupling.

The functionality of the rechargeable battery may for example be the delivery of electrical energy from the rechargeable battery cells of the at least one rechargeable battery to the power tool, the setting of the current intensity, the detection and monitoring of temperature values and/or the setting and detection of the electrical voltage of the rechargeable battery cells of the at least one rechargeable battery. The functionality of the rechargeable battery may be referred to as functions of the rechargeable battery.

In contrast to this, the functionality of the power tool may be the consumption of electrical energy from the rechargeable battery cells of the at least one rechargeable battery to the power tool, the detection of the current intensity, the detection and monitoring of temperature values and/or the detection of the electrical voltage. The functionality of the power tool may be referred to as functions of the rechargeable battery.

Both the power tool and the rechargeable battery have a function with which in particular an oversupply or undersupply of electrical energy, a state of charge, a temperature value, an electrical voltage and/or an electrical current intensity can be detected. To realize such a function, at least one suitable sensor is provided.

Further advantages can be found in the following description of the figures. Various exemplary embodiments of the present invention are shown in the figures. The figures, the description and the claims contain numerous features in combination. A person skilled in the art will expediently also consider the features individually and combine them into useful further combinations.

BRIEF DESCRIPTION OF THE DRAWINGS

In the figures.

DETAILED DESCRIPTION

Figure 1:
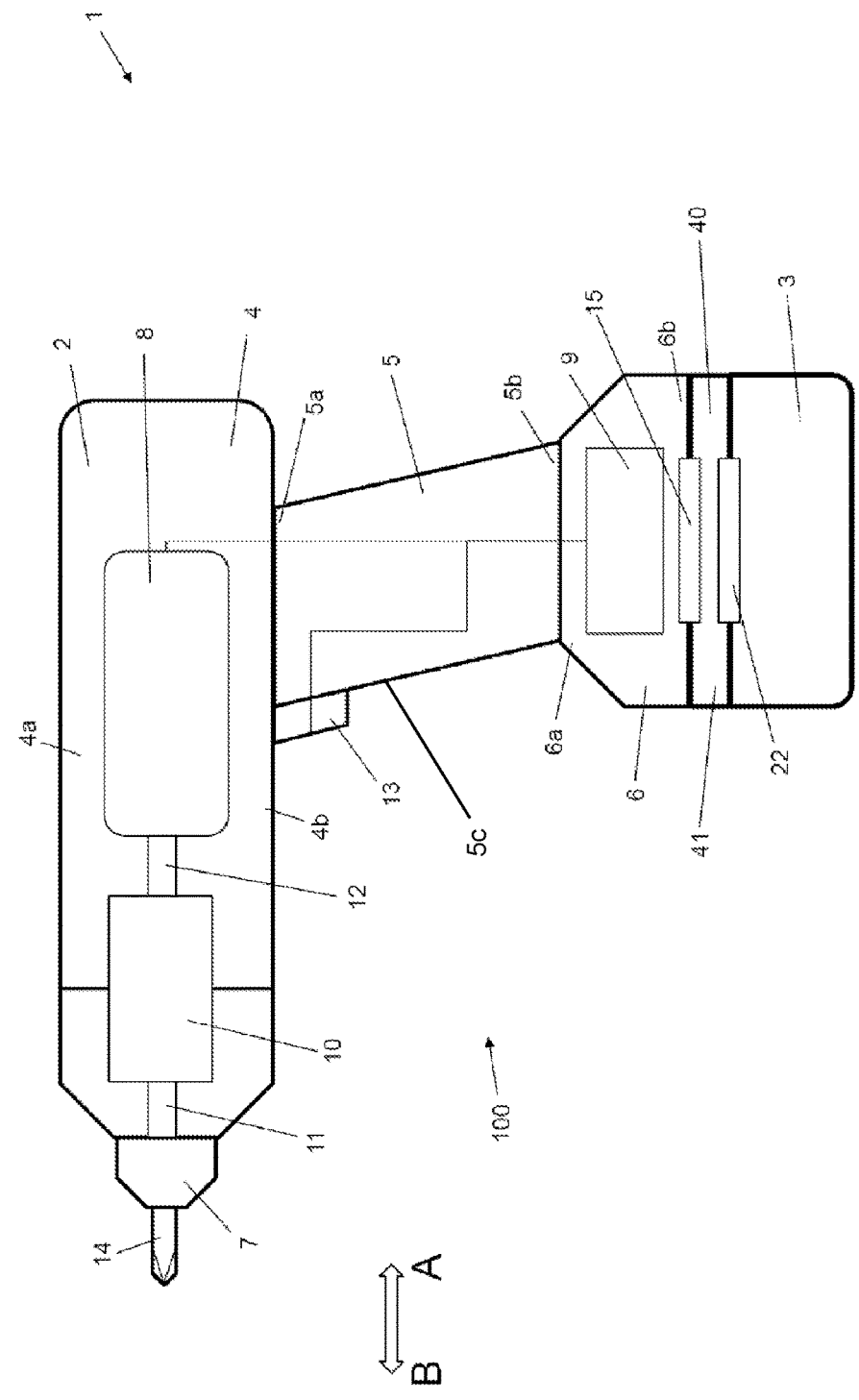
FIG. 1 shows a cross section through a system according to the invention comprising a power tool, a rechargeable battery and an adapter according to the invention positioned between the power tool and the rechargeable battery.

In FIG. 1, a system 1 with a power tool 2, an adapter 40 and a rechargeable battery 3 is shown.

The rechargeable battery 3 is connected to the power tool by the adapter 40 and serves for supplying the electrical loads of the power tool 2 with electrical energy. During the supply, electric current flows from the rechargeable battery 3 through the adapter 40 to the power tool 2.

As illustrated in FIG. 1, the power tool 2 is shown in the form of a rechargeable battery-operated screwdriver. According to other alternative embodiments, the power tool 2 may also be designed in the form of a power drill, a saw, a grinder or the like.

The power tool 2 designed as a rechargeable battery-operated screwdriver substantially comprises a housing 4, a handle 5, a base part 6, a tool fitting 7, an electrical drive 8 in the form of an electric motor, a control device 9, a transmission 10, an input shaft 11, an output shaft 12 and an activation switch 13. The electric motor may be a brushless motor.

The electrical drive 8 designed as an electric motor, the transmission 10, the input shaft 11, the output shaft 12 and the control device 9 are positioned in the housing 4. The drive 8, the transmission 10, the input shaft 11 and the output shaft 12 are positioned in relation to one another and in the housing 10 such that a torque generated by the drive 8 is transmitted to the output shaft 12. The output shaft 12 transmits the torque to the transmission 10, which in turn passes on a torque to the input shaft 11. The tool fitting 7 is driven by way of the input shaft 11 by the transmission of the torque. As illustrated in FIG. 1, a tool 14 in the form of a bit is held in the tool fitting 7. By means of the bit, a screw can be screwed into a material.

As also shown in FIG. 1, the housing 4 comprises an upper side 4a and an underside 4b. The handle 5 comprises a first end 5a and a second end 5b. The first end 5a of the handle 5 is secured to the underside 4b of the housing 4. Furthermore, the base part 6 comprises an upper end 6a and a lower end 6b. The upper end 6a of the base part 6 is secured to the second end 5b of the handle 5. The lower end 6b of the base part 6 comprises an interface 15 and serves for mechanically, electrically and electronically connecting the power tool 2 to the adapter 40. The connection can in this case be released again.

For taking up electrical energy (or electric current), the interface 15 comprises a number of power connections. The interface 15 also comprises data connections for sending and receiving information and data in the form of signals.

Figure 2:
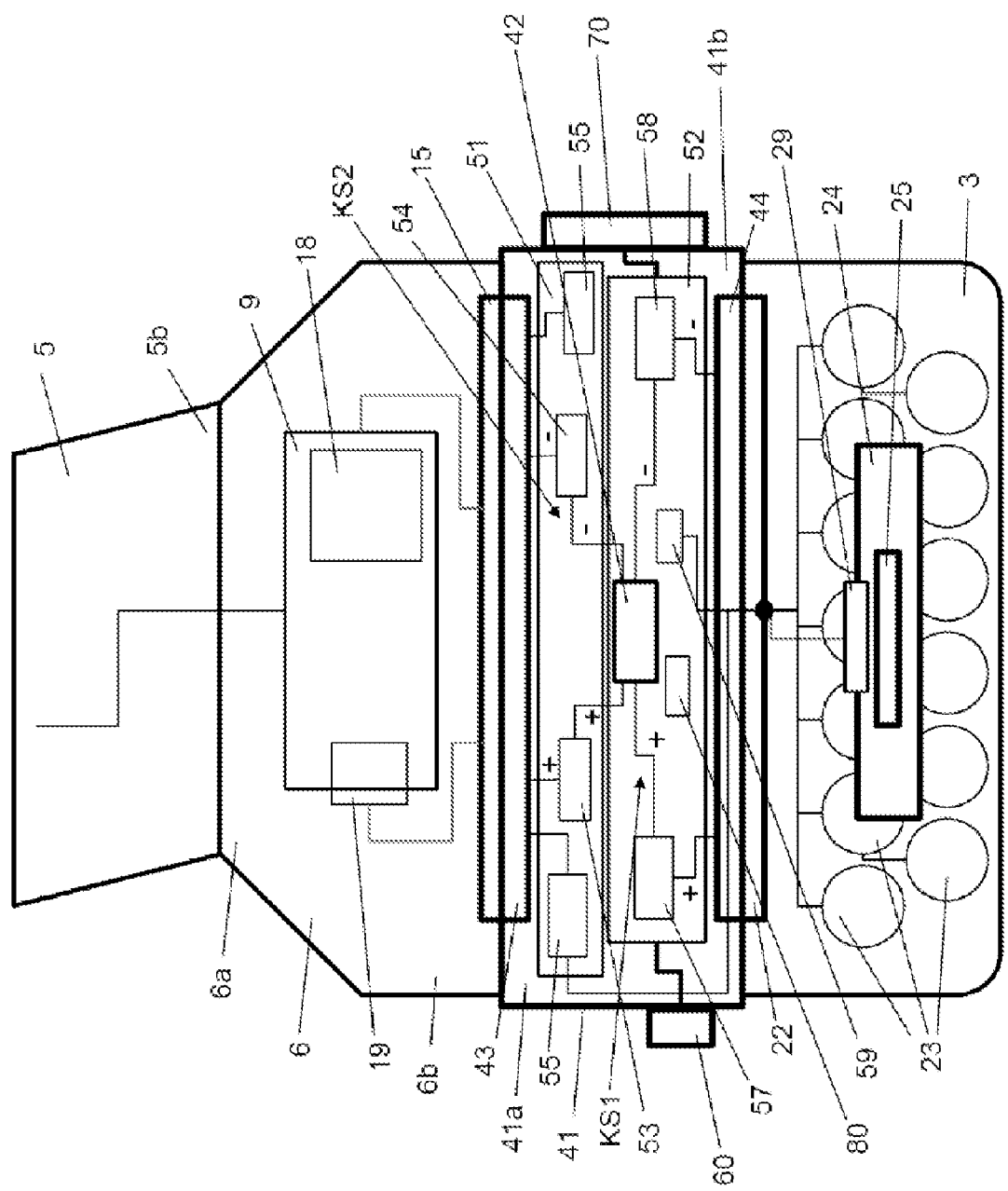
FIG. 2 shows a view of a detail of the power tool, the rechargeable battery and the adapter according to the invention.

As can be seen from FIGS. 1 and 2, the control device 9 of the power tool 2 is positioned in the base part 6 of the power tool 2. The control device 9 of the power tool 2 serves for open-loop and closed-loop control of various processes in relation to the power tool 2 and in relation to the rechargeable battery 3. The control device 9 controls in particular the current or the intensity of the current that flows from the rechargeable battery 3 to the power tool 2, and in particular is used for driving the drive 8 formed as an electric motor. Furthermore, the control device 9 also serves for detecting the electrical voltage that is applied by the rechargeable battery.

The control device 9 of the power tool 2 in this case comprises a microcontroller 18 (also referred to as an MCU) and a data interface 19 as part of a communication circuit for bilateral communication between the rechargeable battery 3 and the power tool 2.

The rechargeable battery 3 substantially comprises a housing 21 with a rechargeable battery interface 22. In the housing 21 of the rechargeable battery 3 there are a multiplicity of energy storage cells 23 and also a set of control electronics 24 with a microcontroller 25.

The rechargeable battery 3 also comprises a data interface 29 as part of the communication circuit for bilateral communication between the rechargeable battery 3 and the power tool 2.

The energy storage cells 23 may also be referred to as rechargeable battery cells and serve for taking up, storing and providing electrical energy or an electrical voltage.

The rechargeable battery interface 22 is positioned on one side of the housing 21. The rechargeable battery interface 22 comprises a number of power connectors for taking up and delivering electric current and also data connectors for transmitting and receiving signals between the power tool 2 and the rechargeable battery 3. The electric current from the energy storage cells 23 can be delivered by way of the power connectors.

The power connectors of the rechargeable battery 3 are connected to the power connections of the power tool 2. Similarly, the data connectors of the rechargeable battery 3 are connected to the data connections of the power tool 2.

Through the connection, electric current can flow from the energy storage cells 23 of the rechargeable battery 3 to the power tool 2. Furthermore, signals can be exchanged for communication between the rechargeable battery 3 and the power tool 2.

As shown in FIGS. 1 and 2, the adapter 40 is positioned between the power tool 2 and the rechargeable battery 3. The adapter 40 is in this case releasably connected both to the power tool 2 and to the rechargeable battery 3.

The adapter 40 comprises a housing 41 with an upper side 41a and an underside 41b. Furthermore, the adapter 40 substantially comprises a first interface 43, a second interface 44, a first set of control electronics 51, a second set of control electronics 52, a switching element 60 and a display device 70.

In addition, the adapter 40 comprises a sensor 80 for detecting at least one parameter of the power tool 1. The parameters may be temperature, voltage, current intensity, operating state or the like.

The first control electronics 51 serve for open-loop and closed-loop control of the functionality of the power tool 2 in relation to the rechargeable battery 3 as a power supply and the second control electronics serve for open-loop and closed-loop control of the functionality of the rechargeable battery 3 in relation to a power tool 2 as a receiver of the electrical energy delivered by the rechargeable battery 3.

The first interface 43 is in this case positioned on the upper side 41a of the adapter housing 41 and the second interface 44 is positioned on the underside 41b of the adapter housing 41. The first interface 43 is designed such that a releasable connection to the interface 15 of the power tool 2 can be created. The second interface 44 is once again designed such that a releasable connection to the rechargeable battery interface 22 of the rechargeable battery 3 can be created.

Figure 3:
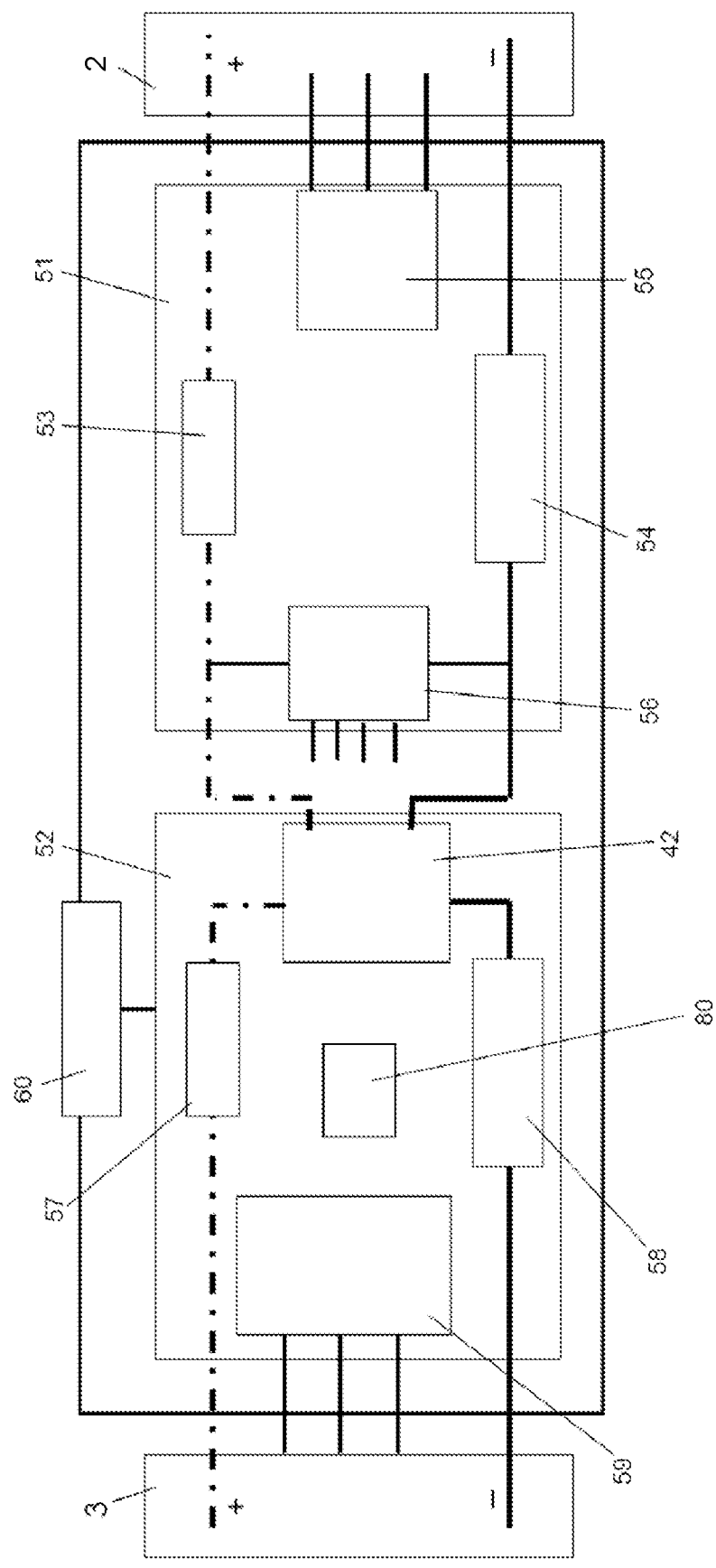
FIG. 3 shows a schematic view of the individual components of the adapter according to the invention.

The first control electronics 51 comprise a first transistor 53, a first current measuring device 54, a first communication device 55 and a voltage device 56. (See also FIG. 3)

The voltage device 56 is connected to the individual rechargeable battery cells 23 and serves for detecting and monitoring the electrical voltage of the individual rechargeable battery cells 23. The communication device 55 serves for communication with the power tool 2 and is designed to send and receive data.

The second control electronics 52 comprise an electric motor driver 42, a second transistor 57, a second current measuring device 58 and a second communication device 59. The second communication device 59 serves for communication with the rechargeable battery 3 and is designed to send and receive data.

Both the first transistor 53 and the second transistor 57 are designed in the cited exemplary embodiment as MOSFETs. The first and second current measuring devices 54, 58 may also be referred to as an ammeter.

As shown in FIG. 2, the switching element 60 and the display device 70 are positioned on an outer side of the housing 41.

The interface 15 of the power tool 2 is incompatible with the rechargeable battery interface 22 of the rechargeable battery 3. In order nevertheless to connect the rechargeable battery 3 to a power tool 2, the adapter 40 is brought between the power tool 2 and the rechargeable battery 3 in such a way that the first interface 43 of the adapter 40 is connected to the interface 15 of the power tool 2 and the second interface 44 of the adapter 40 is connected to the rechargeable battery interface 22 of the rechargeable battery 3. In this way, the rechargeable battery 3 and the power tool 2 are indirectly connected to one another.

Compatibility problems exist if the interfaces do not match each other mechanically, electrically and/or electronically. Even if the interfaces can be mechanically connected to one another, there may be an electronic incompatibility. In the event of an electronic incompatibility, usually no suitable signal is passed through from the power tool 2 to the rechargeable battery 3, whereupon the rechargeable battery 3 sends electrical energy to the power tool 2.

In order to allow electrical energy to pass from the rechargeable battery cell 23 of the rechargeable battery 3 to the power tool 2, first the switching element 60 is actuated. By actuating the switching element 60, a signal to the second control electronics 52 is put into an operating state (also called a mode) in which the second transistor 57 is activated and a first circuit KS1 in the second control electronics 52 is closed. The activation of the second transistor 57 and the closed circuit KS1 allow electrical energy to pass from the rechargeable battery 3 into the adapter 40.

As can be seen from FIG. 1, the activation switch 13 is positioned on a front side 5c of the handle 5. By moving the activation switch 13 in direction A, a signal can be sent from the activation switch 13 to the control device 9, whereby the control device 9 in turn sends a signal via the interfaces 15, 43 to the first control electronics 51 of the adapter 40. The first transistor 53 is activated by the signal and a second circuit KS2 in the first control electronics 51 is closed. The activation of the first transistor 53 and the closed circuit KS2 then allow the electrical energy to pass from the adapter 40 to the power tool 2 and in particular to the drive 8.

What is claimed is:

1. An adapter for releasably connecting a power tool to at least one rechargeable battery, the adapter comprising:
a first interface for releasably connecting the power tool to the adapter and a second interface for releasably connecting the at least one rechargeable battery to the adapter;
a first set of control electronics for open-loop and closed-loop control of functionality of the power tool and a second set of control electronics for open-loop and closed-loop control of functionality of the rechargeable battery; and
a switch for reversibly setting the second set of control electronics to an activation mode or deactivation mode, wherein in the activation mode a first transistor is drivable such that electrical energy is passable from the at least one rechargeable battery to the power tool.

2. The adapter as recited in claim 1 further comprising at least one sensor for detecting at least one parameter of the power tool and a second transistor, the second transistor being designed to interrupt at least temporarily the supply of the electrical energy from the rechargeable battery to the power tool when a parameter detected by the sensor reaches a predetermined threshold value.

3. The adapter as recited in claim 2 further comprising at least one display device for displaying at least one state of the adapter.

4. The adapter as recited in claim 2 further comprising at least one voltage divider for supplying at least the first or second control electronics with electrical energy.

5. The adapter as recited in claim 1 further comprising at least one display device for displaying at least one state of the adapter.

6. The adapter as recited in claim 1 further comprising at least one voltage divider for supplying at least the first or second control electronics with electrical energy.

7. A system comprising:
a power tool with at least one rechargeable battery for supplying the power tool with electrical energy; and
an adapter, the adapter serving for releasably connecting the power tool to the at least one rechargeable battery, the adapter comprising:
a first interface for releasably connecting the power tool to the adapter and a second interface for releasably connecting the at least one rechargeable battery to the adapter;
a first set of control electronics for open-loop and closed-loop control of functionality of the power tool and a second set of control electronics for open-loop and closed-loop control of functionality of the rechargeable battery; and
a switch for reversibly setting the second set of control electronics to an activation mode or deactivation mode, wherein in the activation mode a first transistor is drivable such that electrical energy is passable from the at least one rechargeable battery to the power tool.

8. The system as recited in claim 7 wherein the adapter includes at least one sensor for detecting at least one parameter of the power tool and a second transistor, the second transistor being designed to interrupt at least temporarily the supply of the electrical energy from the rechargeable battery to the power tool when a parameter detected by the sensor reaches a predetermined threshold value.

9. The system as recited in claim 8 wherein the adapter includes at least one display device for displaying at least one state of the adapter.

10. The system as recited in claim 8 wherein the adapter includes at least one voltage divider for supplying at least the first or second control electronics with electrical energy.

11. The system as recited in claim 7 wherein the adapter includes at least one display device for displaying at least one state of the adapter.

12. The system as recited in claim 7 wherein the adapter includes at least one voltage divider for supplying at least the first or second control electronics with electrical energy.

13. A method for open-loop and closed-loop control of an adapter for connecting a power tool to at least one rechargeable battery, the method comprising the steps of:
connecting the adapter to the power tool and the at least one rechargeable battery;
setting the adapter from a deactivation mode to an activation mode; and
driving a first transistor such that electrical energy can pass from the rechargeable battery to the power tool.

14. The method as recited in claim 13 further comprising displaying at least one state of the adapter via at least one display device.

* * * * *